US010005486B2

(12) United States Patent
Jäger et al.

(10) Patent No.: US 10,005,486 B2
(45) Date of Patent: Jun. 26, 2018

(54) STEERING SHAFT FOR A MOTOR VEHICLE

(71) Applicants: ThyssenKrupp Presta AG, Eschen (LI); ThyssenKrupp AG, Essen (DE)

(72) Inventors: Bernhard Jäger, Wangen im Allgäu (DE); Janick Durot, Heerbrugg (CH); Marius Breuer, Lochau (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days. days.

(21) Appl. No.: 15/303,682

(22) PCT Filed: Apr. 10, 2015

(86) PCT No.: PCT/EP2015/057814
§ 371 (c)(1),
(2) Date: Oct. 12, 2016

(87) PCT Pub. No.: WO2015/162019
PCT Pub. Date: Oct. 29, 2015

(65) Prior Publication Data
US 2017/0036690 A1    Feb. 9, 2017

(30) Foreign Application Priority Data

Apr. 25, 2014  (DE) .................. 10 2014 105 822

(51) Int. Cl.
*B62D 1/185* (2006.01)
*F16D 3/06* (2006.01)
(Continued)

(52) U.S. Cl.
CPC .............. *B62D 1/185* (2013.01); *B62D 1/20* (2013.01); *F16C 3/03* (2013.01); *F16D 3/06* (2013.01);
(Continued)

(58) Field of Classification Search
CPC . B62D 1/185; B62D 1/20; B62D 3/12; B62D 5/04; B62D 5/06; F16C 3/03; F16C 3/06; F16C 3/12; F16C 2326/24
See application file for complete search history.

(56) References Cited

U.S. PATENT DOCUMENTS

| 9,618,052 B2 * | 4/2017 | Miyake .................. F16D 1/101 |
| 2006/0130309 A1 * | 6/2006 | Keller .................... B23B 25/00 29/558 |

(Continued)

FOREIGN PATENT DOCUMENTS

| DE | 3202669 A1 | 8/1983 |
| DE | 3624473 A1 | 1/1987 |

(Continued)

OTHER PUBLICATIONS

Int'l Search Report for PCT/EP2015/057814 dated Jun. 4, 2015 (dated Jun. 10, 2015).

(Continued)

*Primary Examiner* — Drew J Brown
(74) *Attorney, Agent, or Firm* — thyssenkrupp North America, Inc.

(57) ABSTRACT

A steering shaft for a motor vehicle may comprise a first shaft part and a second shaft part that is telescopable with respect to the first shaft part. The first shaft part may comprise at least one spline region with at least one guide element that is in a form-fit engagement with the second shaft part for guiding the first shaft part relative to the second shaft part during the telescoping and with at least one transmission element that is in engagement with the second shaft part via a loose form-fit for transmitting a torque. The spline region may be at least partially overmolded with a plastic, and the guide element may be formed by the overmolding.

20 Claims, 2 Drawing Sheets

(51) Int. Cl.
  *B62D 1/20* (2006.01)
  *F16C 3/03* (2006.01)
  *B62D 3/12* (2006.01)
  *B62D 5/04* (2006.01)
  *B62D 5/06* (2006.01)

(52) U.S. Cl.
  CPC .............. *B62D 3/12* (2013.01); *B62D 5/04* (2013.01); *B62D 5/06* (2013.01); *F16C 2326/24* (2013.01)

(56) References Cited

U.S. PATENT DOCUMENTS

| | | | | |
|---|---|---|---|---|
| 2006/0213244 | A1* | 9/2006 | Brissette | B21D 15/02 72/46 |
| 2007/0157754 | A1* | 7/2007 | Yamada | B62D 1/185 74/493 |
| 2008/0314190 | A1* | 12/2008 | Miyawaki | B62D 1/185 74/496 |
| 2009/0124399 | A1 | 5/2009 | Jung et al. | |
| 2009/0145257 | A1* | 6/2009 | Miyawaki | B62D 1/185 74/493 |
| 2011/0034256 | A1* | 2/2011 | Tokioka | B62D 1/185 464/162 |
| 2014/0080614 | A1 | 3/2014 | Nabeshima et al. | |

FOREIGN PATENT DOCUMENTS

| | | |
|---|---|---|
| DE | 102010049106 A1 | 6/2011 |
| EP | 2090493 B1 | 8/2009 |
| EP | 2281731 A2 | 2/2011 |
| EP | 2282071 A2 | 2/2011 |
| JP | 2005180631 A | 7/2005 |
| JP | 2012122610 A | 6/2012 |
| WO | 2010037509 A1 | 4/2010 |

OTHER PUBLICATIONS

English Language Abstract for WO2010037509A1.
English Language Abstract for JP2005180631A.
English language Abstract for JP 2012122610 A.
English language Abstract for DE 10 2010 049 106 A1.
English language machine translation for DE 3202669 A1.
English language machine translation for DE 3624473 A1.

* cited by examiner

STEERING SHAFT FOR A MOTOR VEHICLE

CROSS REFERENCE TO RELATED APPLICATIONS

This application is a U.S. National Stage Entry of International Patent Application Serial Number PCT/EP2015/057814, filed Apr. 10, 2015, which claims priority to German Patent Application No. DE 10 2014 105 822.4 filed Apr. 25, 2014, the entire contents of both of which are incorporated herein by reference.

FIELD

The present disclosure relates to steering shafts for motor vehicles and, more particularly, to telescoping steering shafts for motor vehicles.

BACKGROUND

Telescopable steering shafts for motor vehicles are known, in the case of which an inner spindle and an outer spindle which is complementarily arranged coaxially to the inner spindle are provided, which are telescopable relative to one another. In this manner, a position-adjustable steering column can be realized in motor vehicles, by means of which the steering wheel position can be adapted, at least in axial direction of the steering shaft, to the respective driver position in order to correspondingly improve the ergonomics for the driver of the motor vehicle and thus the safety. Telescopable steering shafts are known, furthermore, for safety steering columns in the case of which the steering shaft in the event of a crash is shortened or yields, for example in that the driver impacts the steering wheel and then pushes the steering wheel back together with the steering shaft.

Telescopable steering shafts are employed in motor vehicles between the steering gear and the steering wheel and, in addition to the position adjustment and crash safety, serve to also offset minor changes of the spacing between the steering gear and the steering column, which for example occur because of dynamic loads in driving operation through the corresponding twisting of the chassis, but also through movements of the steering gear in a rubber mounting. These minor changes of the spacing are to be offset by the telescopable steering shaft with as little noise as possible and should not be noticed by the driver.

Such a telescopable steering shaft can for example be designed as steering spindle in a steering column and/or as steering intermediate shaft between the steering spindle and a steering gear.

In addition to a smooth and non-jerking axial adjustment, the steering shaft with the telescope mechanism is to also provide as hysteresis-free as possible a transmission of the steering torque between the inner spindle and the outer spindle so that the driver on the one hand cannot detect any difference between a steering deflection into the one direction and a steering deflection into the other direction, and on the other hand any play during the transmission of the torque between the inner spindle and the outer spindle is not noticed by the driver.

In order to make available to the driver as good as possible a shifting sensation when telescoping the steering shaft for adjusting the steering wheel position it is desirable to reduce or largely avoid in particular a stick-slip effect, that is an initial sticking and sudden breaking-away of the parts relative to one another in order to make possible a fluid and low-noise adjusting of the position of the steering wheel. In addition, noises which are generated by the introduction of vibrations in driving mode are to be reduced or avoided in this way. Even for this reason, the stick-slip effect is to be reduced or avoided, by way of which because of the frequent breaking-away during the introduction of vibration while driving noises can likewise develop.

In this regard, sliding sleeves are known from the prior art which are arranged between the inner spindle and the outer spindle and which serve in order to reduce the friction between the inner spindle and the outer spindle during telescoping. Such a sliding sleeve is known for example from WO2010/037509 A1, which represents a sliding sleeve with permanently improved sliding characteristics.

From JP 2005-180631 A a sliding shaft connection is known, in the case of which a spline system applied to the inner shaft comprises splines with two different geometries, so that in the load-free state, i.e. without generating a steering moment, not all splines are in engagement with the outer shaft. These different spline system geometries on the inner shaft are highly elaborate to produce and require particularly high tolerance accuracies.

From EP 2 090 493 B1 a vehicle steering shaft and a vehicle steering device are known, in the case of which elastic connecting elements are glued into grooves of the inner shaft which extend in the shaft direction. Such a steering shaft also requires elaborate production.

BRIEF DESCRIPTION OF THE FIGURES AND TABLES

DETAILED DESCRIPTION

Figure 1:
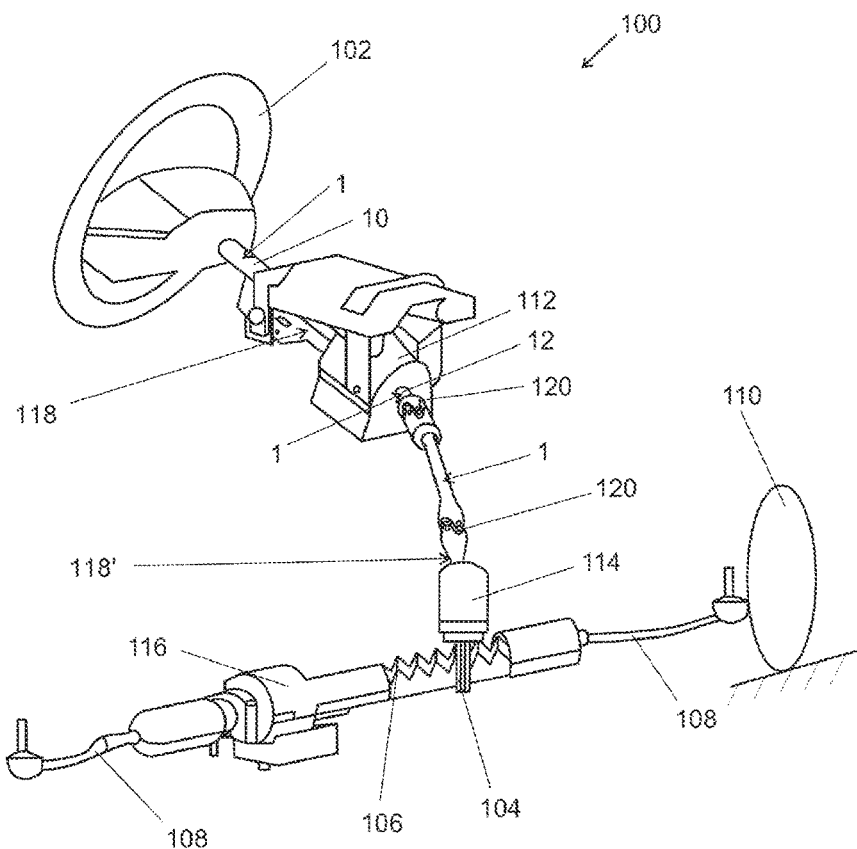
FIG. 1 is a schematic perspective view of an example motor vehicle power steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element.

The present disclosure generally concerns steering shafts for motor vehicles. In some examples, the steering shafts may comprise a first shaft part and a second shaft part that is telescopable with respect to the first shaft part.

Starting out from the known prior art it is an object of the present invention to provide a telescopable steering shaft which has a high torsional stiffness with a low sliding force and is more easily producible at the same time.

Accordingly, a steering shaft for a motor vehicle is proposed comprising a first shaft part and a second shaft part that is telescopable with respect to the former, wherein the first shaft part comprises at least one spline region with at least one guide element which is in form-fit engagement with the second shaft part for guiding the first shaft part relative to the second shaft part during the telescoping and with at least one transmission element which is in engagement with the second shaft part via a loose form-fit, for transmitting a torque. According to the invention, the spline region is at least partially overmolded with a plastic and the guide element is formed in the overmolding.

Because of the fact that the first shaft part is overmolded with a plastic and the guide element is formed in the overmolding, the required low sliding force for telescoping along the shaft direction can be attained since in the load-free state, that is without generating a torque on the steering shaft, a form-fit contact between the first shaft part and the second shaft part only takes place by way of the guide element formed from plastic, which is in form-fit engagement with the second shaft part. The transmission elements by contrast are in engagement with the second shaft part only by way of a loose form-fit, so that in this case very little or even no friction occurs, since a contact between the transmission elements and the second shaft part does not occur. Furthermore, only friction between plastic and metal occurs here, wherein a particularly preferable friction behavior can be achieved by selecting the plastic.

For transmitting a torque from the first shaft part to the second shaft part subject to forming a high torsional stiffness, the transmission elements that are provided on the first shaft part then come into engagement with the second shaft part as soon as a minor relative rotation between the first shaft part and the second shaft part has taken place and through the loose form-fit between the transmission elements and the structures in the second shaft part that are complementary thereto the air gap formed is overcome. For transmitting a torque, substantially all transmission elements are then available so that a torque or a steering moment with a high torsional stiffness can be transmitted by means of the proposed steering shaft. The guide elements also contribute to the torque transmission, the contribution being dependent on the respective elasticity of the plastic material or of the guide element. If the guide element is highly elastic, the contribution to transmitting the torque is low and the transmission elements come into engagement with the structures in the second shaft part that are complementary thereto even upon minor relative rotations between the first and the second shaft part.

Because of the fact that the first shaft part is overmolded with a plastic, the same can also be produced in a simple manner. The elaborate formation of splines with different geometries in the metallic first shaft part can be suitably omitted. Overmolding or molding from plastic is significantly easier to carry out than forming or chip-removing processing of the metallic basic body of the first shaft part. Furthermore, the injection molds necessary for forming the overmolding are significantly easier and more cost-effective to produce than possible forming tools.

The spline region is preferably formed metallically, wherein the first and the second shaft part are preferably formed metallically and are produced for example by forming, for example by way of cold extrusion, rotary swaging, extrusion molding or axial forming or chip-removing processing.

Preferably, the spline region is overmolded with the plastic about the circumference of the first shaft part. Accordingly, even in the presence of a low torque, a favorable sliding force can still be brought about in this way since the entire spline region is overmolded and the plastic surfaces of the overmolding of the first shaft part thus formed in this manner rub against the metal surfaces of the structures of the second shaft part that are complementary thereto. In this way, the occurrence of a stick-slip effect can be reduced or entirely avoided so that to the driver a harmonic sliding feeling in the direction of the shaft axis materializes. Furthermore, the noise level can be reduced in this way.

Preferably, in the spline region of the first shaft part a uniform spline system with splines of the same geometry is provided and at least one spline for forming at least one guide element is provided with the overmolding. In terms of the invention, a uniform spline system is to mean a regular spline system in the case of which all splines have same spacings and forms. The designations regular and uniform are correspondingly used as synonyms. By forming a uniform spline system with splines of the same geometry, a simple and reliable production with the simultaneous presence of high functional safety can be achieved by forming a functionally-secure loose form-fit. Particularly preferably, through the overmolding of the regular spline system a coating of the spline region is formed, wherein the coating in the region of at least one guide element is formed thicker than in the region of at least one transmission element. Accordingly, the guide elements and the transmission elements can be formed in a particularly simple and highly reliable manner, while the structural integrity of the respective elements of the plastic coating is provided by the metallic splines of the spline region arranged below. Viewed from the outside, the spline system appears irregular through the variable thickness of the coating. It is also conceivable and possible in principle to configure the thickness of the overmolding on the circumference distributed in an even manner and to form the preferably metallic splines arranged below irregularly in order to create guide elements and transmission elements in this way. In this case, the overmolding has to comprise the correspondingly necessary elasticity at least in the region of the guide elements.

In a further development of the steering shaft, the spline region comprises a spline system with splines of the same geometry, wherein at least one missing spline is provided, in the position of which the guide element is formed in the overmolding. Such a spline region can also be produced in a simple manner since the forming of a missing spline does not pose any special requirements of the tools to be used. By forming the guide element in the position of the missing spline, the guide element can be formed with a larger volume of plastic material than is the case when providing a coating of splines of the same geometry. Because of the larger plastic volume for forming the guide element, the elasticity of the guide element can be varied over a wider region and be adapted to the respective application case.

Preferably, the guide element in its spline head region comprises a recess which extends in the direction of the shaft axis of the first shaft element for forming two resilient flanks independently of one another for the guide element elastically lying against a complementary structure of the second shaft part.

By way of the aforementioned structures, the slight relative rotation between the first shaft part and the second shaft part for placing the transmission elements against the respective structure that is complementary thereto for the torsionally rigid transmission of the torque can be made possible. The guide element in this case does not participate in the transmission of the torque or only unsubstantially so.

Preferably, between the first shaft part and the second shaft part a loose form-fit for transmitting a torque even in the absence of the overmolding is formed, wherein in this case the loose form-fit is provided by way of a metallic spline system of the first shaft part with respect to a structure in the second shaft part that is complementary thereto. Accordingly, a torque transmission can then take place even when the overmolding of plastic is no longer present. In this way, an increased safety of the steering shaft can be provided since even in the case of a complete wear or destruction of the plastic overmolding, steering maneuvers of the motor vehicle can still be executed.

A reduction of the sliding forces can be achieved when the guide element comprises a surface geometry for forming point contacts or a surface geometry for forming line contacts with a complementary structure of the second shaft element. The overmolding makes possible forming suitable structures in a simple manner by configuring the injection mold.

For forming a symmetrical structure, at least two, three or four guide elements are arranged evenly distributed about the circumference of the spline region and between two guide elements at least one transmission element is arranged in each case. Accordingly, the slidability, in the load-free state, can be further improved. Through as low as possible a number of guide elements, the necessary sliding force for telescoping the first shaft part relative to the second shaft part can be kept low. Through the symmetrical arrangement, it can be achieved furthermore that a secure guidance of the first shaft part relative to the second shaft part is achieved so that canting or the occurrence of rattling noises or vibrations can be reduced or avoided.

The plastic selected for the overmolding is preferably an elastic plastic such that the guide element in the load-free state always returns into its original form and thus because of the form-fit between the first and the second shaft part, provides quasi a neutral position of the two shaft parts relative to one another by way of the preload. Accordingly, a reduced or no hysteresis occurs and the driver, during normal operation, when introducing a steering moment, does not notice that initially subject to elastic deformation of the guide element the air gap formed by the loose form-fit between the transmission elements and the second shaft part has to be overcome before a stiff steering connection is provided.

The plastic overmolding preferably provides a coating of the spline system of the first shaft part in the regions in which the transmission elements are formed. In the regions in which the guide elements are formed this coating is preferably formed thicker in such a manner that a form-fit of the guide elements with the structures in the second shaft part that are complementary thereto is ensured. Depending on the geometry of the guide elements, contact can be by way of an areal contact or a line contact or, with a correspondingly wavy formation of the guide elements, even a point contact. For reducing or avoiding the stick-slip effect, a linear or punctiform contact between the guide element provided on the first shaft part and the second shaft part can be preferably provided.

Accordingly, the first and second shaft parts consisting of metal can be simply formed and the design of the guide elements, which are provided for example by a larger spline, can be accomplished through the overmolding with plastic so that altogether a simplified producibility results.

The first shaft part is preferably an inner shaft, onto which a spline system is applied, and the second shaft part is preferably an outer shaft, which comprises a substantially cylindrical reception for receiving the inner shaft, and on the cylindrical inner side a corresponding spline system that is complementary to the spline system of the inner shaft is provided.

With reference now to the figures, various examples are described. Here, same, similar or elements with the same effect are marked with like reference signs in the various figures. Moreover, it should be understood that a repeated description of many of these elements is partly omitted where possible to avoid redundancies.

In FIG. 1, a schematic representation of a motor vehicle steering 100 is shown, wherein a driver by way of a steering wheel 102 can introduce a corresponding torque as steering command into a steering shaft 1. The torque is then transmitted via the steering shaft 1 to a steering pinion 104 which meshes with a rack 106, which then in turn transmits the preset steering angle to the steerable wheels 110 of the motor vehicle by way of corresponding track rods 108.

An electrical and/or hydraulic power steering system can be provided in the form of the power steering system 112 that is coupled to the steering shaft 1, of the power steering system 114 coupled to the pinion 104 and/or to the power steering system 116 coupled to the rack 106. The respective power steering system 112, 114 or 116 introduces a servo torque into the steering shaft 1, the steering pinion 104 and/or a servo force into the rack 106, as a result of which the driver is assisted in the steering work. The three different power steering systems 112, 114 and 116 shown in FIG. 1 show possible positions for their arrangement. Usually, only a single one of the shown positions is assigned a power steering system. The servo torque or the servo force which is to be generated for assisting the driver by means of the respective power steering system 112, 114 or 116 is determined taking into account an input torque determined by a torque sensor 118. Alternatively or combined with the introduction of the servo torque or of the servo force, an additional steering angle can be introduced into the steering system with the power steering system 112, 114, 116, which is added up with the steering angle generated by the driver via the steering wheel 102.

The steering shaft 1 comprises an input shaft 10 that is connected to the steering wheel 102 and an output shaft 12 that is connected to the rack 106 via the steering pinion 104. The input shaft 10 and the output shaft 12 are rotation-elastically coupled to one another by way of a torsion bar which is not evident in FIG. 1. Thus, a torque introduced by a driver into the input shaft 10 via the steering wheel 102 leads to a relative rotation of the input shaft 10 with respect to the output shaft 12 when the output shaft 12 does not rotate exactly synchronously to the input shaft 10. This relative rotation between input shaft 10 and output shaft 12 can be measured for example by way of a rotary angle sensor and accordingly be determined based on the known torsional stiffness of the torsion bar into a corresponding input torque relative to the output shaft. In this way, by determining the relative rotation between input shaft 10 and output shaft 12 the torque sensor 118 is formed. Such a torque sensor 118 is known in principle and can be realized for example in the form of a rotary slide valve, an electromagnetic or other measurement of the relative rotation.

Accordingly, a torque, which is exerted by the driver via the steering wheel 102 onto the steering shaft 1 or the input shaft 10 will cause the introduction of a servo torque by one of the power steering systems 112, 114, 116 only when the output shaft 12 is rotated against the rotational resistance of the torsion bar relative to the input shaft 10.

Alternatively, the torque sensor 118 can also be arranged in the position 118', wherein the break-through of the steering shaft 1 into input shaft 10 and output shaft 12 and the rotation-elastic coupling via the torsion bar is then correspondingly present in another position in order to be able to determine from the relative rotation of the output shaft 12 that is coupled to the input shaft 10 via the torsion bar a relative rotation and thus accordingly an input torque and/or a servo force to be introduced.

The steering shaft 1 in FIG. 1 furthermore comprises at least one universal joint 120, by means of which the profile of the steering shaft 1 in the motor vehicle can be adapted to the spatial conditions.

Figure 2:
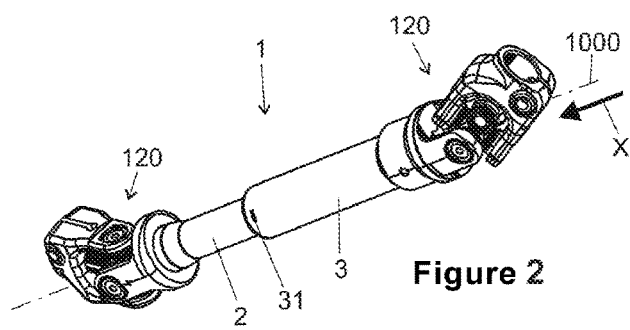
FIG. 2 is a schematic perspective view of an example telescopable steering shaft.

In FIG. 2, a steering shaft 1 is shown in a schematic perspective representation. The steering shaft 1 comprises a first shaft part 2, which is shown here in the form of an inner shaft, and a second shaft part 3, which is shown here in the form of an outer shaft. The first shaft part 2 is telescopable relative to the second shaft part 3 in telescoping direction X, wherein the telescoping direction X extends in the direction of the shaft axis 1000 of the steering shaft 1.

Figure 3:
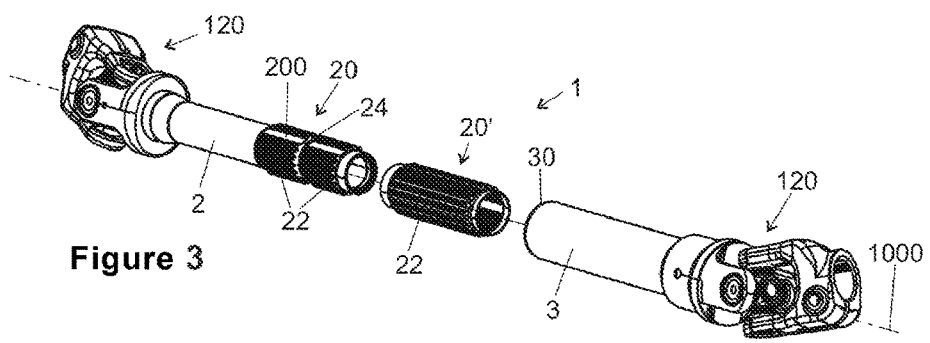
FIG. 3 is a schematic perspective view of an example steering shaft that has been expanded for purposes of illustration.

In FIG. 3, the steering shaft 1 from FIG. 2 is shown in an expanded representation. It is evident that the first shaft part 2 comprises a spline region 20 which is provided with a plurality of splines 200, which extend in the direction of the axis 1000 of the steering shaft 1.

The first shaft part 2 can be introduced into the second shaft part 3 and be extracted again from the same and be telescoped in this way. At the same time, the spline region 20 serves for coming into engagement with structures that are complementary thereto in a recess 30 in the second shaft part 3 so that a torque transmission is made possible. In order to prevent complete extraction of the first shaft part 2 from the second shaft part 3 following the assembly, an extraction protection such as for example a caulking 31 can be provided.

The spline region 20 of the first shaft part 2 is schematically shown in FIG. 3 in two different embodiments. The first spline region 20 comprises two different spline system sections 22 between which a groove 24 is formed, which separates the two spline system sections 22. The two spline system sections 22 can thus be formed differently. In particular, a spline system section 22 can comprise the guide elements described in the following, preferably combined with the transmission elements described in the following, but the other spline system section 22 only comprises transmission elements. The two spline system sections 22 however can also be embodied identically. In an alternative, the spline region 20' is shown, which comprises a single continuous spline system section 22, which correspondingly comprises both guide elements and also transmission elements.

The second shaft part 3 comprises a recess 30 and on its inner side a spline system structure, which is substantially complementary to the spline region 20 of the first shaft part 2. The spline system structure makes possible the transmission of a torque, but does not impair the telescopability.

Figure 4:
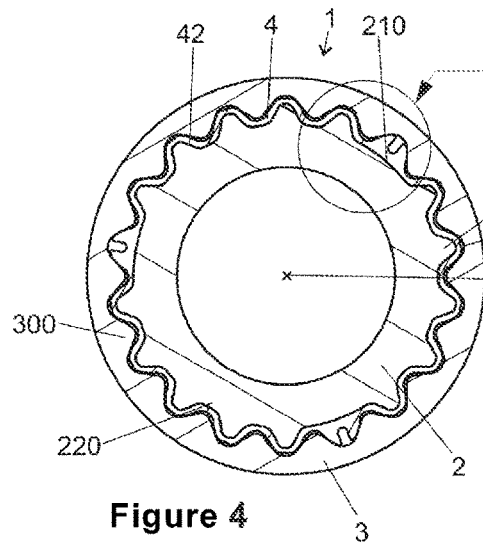
FIG. 4 is a schematic sectional view of an example steering shaft.
Figure 5:
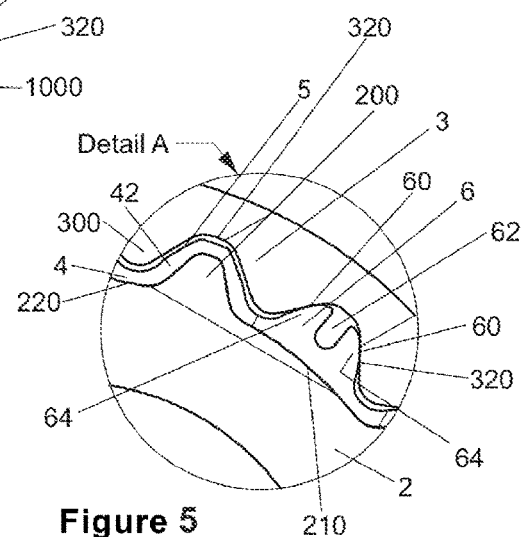
FIG. 5 is a detail view of the example steering shaft of FIG. 4.

This embodiment is shown once more in FIGS. 4 and 5, which show cross-sectional representations through a steering shaft 1 in the spline region. The spline region 20 of the first shaft part 2 is formed here with a spline system having splines 200 and recesses 220 located in between, wherein about the circumference of the spline region 20 the geometry of the splines 200 does not differ. Accordingly, all splines 200 are designed identically and are arranged substantially regularly about the circumference of the first shaft part 2. However, three missing splines 210 are provided, in the case of which no spline 200 is formed. The three missing splines 210 are in each case arranged at an angle of rotation of 120° to one another.

The second shaft part 3 likewise comprises a spline system with splines 300, between which corresponding recesses 320 are arranged. The splines 300 and the recesses 320 are provided on the inside of the second shaft part 3. Accordingly, the splines 200 of the first shaft part 2 engage into recesses 320 of the second shaft part 3 which are complementary thereto. The splines 300 of the second shaft part 3 correspondingly engage in recesses 220 of the first shaft part 2 which are complementary thereto.

As is evident from FIG. 4 and the detail representation from FIG. 5, a loose form-fit exists between the first shaft part 2 and the second shaft part 3. Accordingly, during the generating of a torque for example onto the second shaft part 3 a relative rotation between the first shaft part 2 and the second shaft part 3 initially takes place until the respective splines 200, 300 come to lie against respective recesses 220, 320. During the corresponding rotating-back, a relative movement, because of the loose form-fit, would initially occur again between the first shaft part 2 and the second shaft part 3 until all splines 200, 300 again lie against the respective recesses 220, 320 or their flanks.

The first shaft part 2 and the second shaft part 3 are preferably produced from a metal for example by forming or a chip-removing method so that a secure transmission of a torque can take place after the air gap formed by the loose form-fit has been overcome by a part of the active torque and the relative rotation resulting from that between the first shaft part 2 and the second shaft part 3.

The spline region 20 of the first shaft part 2 is provided with an overmolding 4 from a plastic which in the region of the splines 200 and of the recesses 220 forms a coating 42 with a substantially constant thickness.

As is evident in particular from FIG. 5, an air gap 5 is formed in the region of the splines 200, 300 and the respective recesses 220, 320 which are complementary thereto even in the presence of the coating 42 in such a manner that even despite the overmolding 4 in the region of the splines 200 a loose form-fit is present between the first and the second shaft part.

The splines 200 in the spline region 20 provided with the overmolding 4 are provided as transmission elements 40 which following the overcoming of the air gap 5 by a corresponding relative rotation between the first shaft part 2 and the second shaft part 3 come into contact with a flank of the structure of the second shaft part that is in each case complementary thereto and make possible in this way a torque transmission with a high torsional stiffness.

In the region of the missing splines 210, the overmolding 4 forms a guide element 6. The overmolding 4 accordingly forms the guide elements 6 and the coating 42 in the spline region 20 of the first shaft part 2.

The guide element 6 is dimensioned larger than the splines 200 combined with the coating 42. The guide element 6 thus lies against the recess 320 of the second shaft part 3 in the assembled state in a form-fit manner such that a linear contact region 60 is formed, which is present on both flanks of the guide element 6. Accordingly, the first shaft part 2 is in form-fit connection with the second shaft part 3 via the guide element 6. Depending on the dimensioning of the guide element 6, a low-play or play-free connection between the first shaft part 2 and the second shaft part 3 can thus be achieved.

The guide element 6, in the shown exemplary embodiment furthermore comprises in its spline head region a recess 62 so that two resilient flanks 64 are formed, which, as described before, lie against the second shaft part 3 structures that are complementary thereto in the linear contact regions 60, for example the recesses 320. By forming the recess 62 in the spline head region, the same can be correspondingly formed so resiliently that for example even with a minor overdimensioning of the guide element 6 a preload can always be generated in such a manner that a play-free seat of the first shaft part 2 relative to the second shaft part 3 is achieved. Accordingly, a driver when turning the steering wheel does not notice that the guide element 6 is initially deformed slightly elastically until the transmission elements 40 of the first shaft part 2 come to lie against the respective structures of the second shaft part 3 which are complementary thereto, in order to thus achieve a secure torque transmission with a high torsional stiffness.

Because of the fact that both the coating 42 and also the guide element 6 in the spline region 20 are molded onto the metallic basic body of the first shaft part 2 a simple production both of the guide elements 6 and also of the coating 42 can be achieved. Accordingly, the steering shaft 1 formed in this manner is advantageously producible but offers a preferred sliding behavior in the telescoping direction X at the same time since in the load-free state merely the guide elements 6 of the first shaft part 2 are in direct contact with the second shaft part 3 along the linear sections 60, but the transmission elements 40 with their coating 42 are not in contact with the second shaft part 3 so that low-friction and simple slidability of the two shaft parts 2, 3 against one another is provided.

However, for transmitting a torque all transmission elements 40 in the form of the splines 200, 300 combined with the coating 42 come to lie against the respective recesses 200, 300 so that a torsionally stiff and secure transmission of the torque is made possible.

Figure 6:
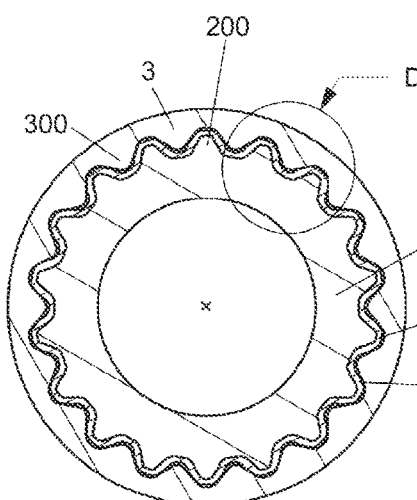
FIG. 6 is a schematic sectional view of another example steering shaft.
Figure 7:
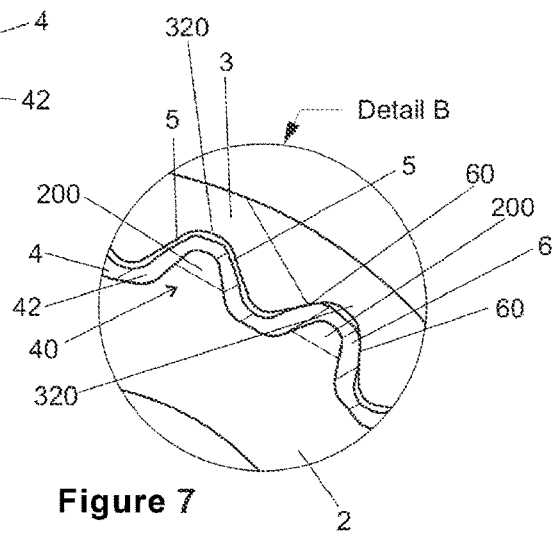
FIG. 7 is a detail view of the example steering shaft of FIG. 6.

In FIGS. 6 and 7 a further exemplary embodiment is shown in the case of which the spline region 20 of the first shaft part 2 in turn is provided with an overmolding 4, which forms a coating 42 with different thicknesses.

The first shaft part 2 in turn comprises in the spline region 20 about its circumference a plurality of splines 200 which are regularly arranged and all of which have a same geometry. Accordingly, the first shaft part 2 is simply producible in conventional manner. The second shaft part 3 also comprises a plurality of splines 300 which likewise have the same geometry.

The overmolding 4 in the region of the transmission elements 40 is again designed as coating 42 on the splines 200 of the first shaft part 2 with such a thickness that an air gap 5 between the transmission element 40 and the respective structure corresponding thereto, for example the recess 320, of the second shaft part 3 is formed. In other words, the transmission elements 40 of the first shaft part 2 again form a loose form-fit with the second shaft part 3.

In the region of the guide elements 6, the coating 42 of the splines 200 by contrast has such a thickness that the guide elements 6 formed in such a manner are in engagement in a form-fit manner with the structures of the second shaft part 3 that are complementary thereto. The geometry of the guide elements 6 in this case is formed through the corresponding shaping of the coating 42 so that a linear contact region 60 on the corresponding recess 320 of the second shaft part 3 is formed. In this way, the forming in turn of a form-fit and substantially play-free connection between the first shaft part 2 and the second shaft part 3 is achieved.

Insofar as applicable, all individual features which are shown in the individual exemplary embodiments can be combined with one another and/or exchanged with one another without leaving the scope of the invention.

What is claimed is:

1. A steering shaft for a motor vehicle, the steering shaft comprising:
   a first shaft; and
   a second shaft part that is telescopable with respect to the first shaft part, wherein the first shaft part comprises a spline region that is at least partially overmolded with a plastic, the spline region including
      a guide element that is formed in the overmolding and is in form-fit engagement with the second shaft for guiding the first shaft part relative to the second shaft part during telescoping, wherein the guide element in a spline head region comprises a recess that extends in a direction of a shaft axis of the first shaft part for forming resilient flanks for the guide element elastically lying against a complementary structure of the second shaft part, and
      a transmission element that is in engagement with the second shaft part via a loose form-fit for transmitting a torque.

2. The steering shaft of claim 1 wherein the plastic of the spline region is an elastic plastic, the spline region further comprising a metal.

3. The steering shaft of claim 1 wherein the spline region is overmolded with the plastic about a circumference of the first shaft part.

4. The steering shaft of claim 1 wherein the spline region comprises a uniform spline system with splines of a same geometry and a spline for forming the guide element with the overmolding.

5. The steering shaft of claim 4 wherein through the overmolding of the spline system a coating of the spline region is formed, wherein the coating is thicker in a region of the guide element than in a region of the transmission element.

6. The steering shaft of claim 1 wherein a loose form-fit between the first and second shaft parts is formed for transmitting a torque in an absence of the overmolding.

7. The steering shaft of claim 1 wherein the guide element comprises a surface geometry for forming point contacts or a surface geometry for forming line contacts with a complementary structure of the second shaft element.

8. The steering shaft of claim 1 wherein at least two, three, or four guide elements are disposed evenly about a circumference of the spline region, with a transmission element disposed between two guide elements in each case.

9. A steering shaft for a motor vehicle, the steering shaft comprising:
   a first shaft; and
   a second shaft part that telescopes within the first shaft part, wherein the first shaft part comprises a spline region with a plastic coating, the spline region including
      a guide element that is formed in the plastic coating and is in form-fit engagement with the second shaft part for guiding the first shaft part relative to the second shaft part,
      a transmission element that is in engagement with the second shaft part for transmitting a torque, wherein the engagement between the transmission element and the second shaft is more loosely form-fit than the form-fit engagement between the guide element and the second shaft part, and a spline system with splines of a same geometry, wherein a missing spline is disposed in a position where the guide element is formed by the plastic coating.

10. The steering shaft of claim 9 wherein the plastic coating is an elastic plastic, wherein the spline region further comprises metal.

11. The steering shaft of claim 9 wherein the plastic coating is disposed about a circumference of the first shaft part.

12. The steering shaft of claim 9 wherein the plastic coating is thicker in a region of the guide element than in a region of the transmission element.

13. The steering shaft of claim 9 wherein in regions lacking the plastic coating a loose form-fit between the first and second shaft parts is formed for transmitting a torque.

14. The steering shaft of claim 9 wherein the guide element comprises a surface geometry for forming contact points or line contacts with a complementary structure of the second shaft element.

15. The steering shaft of claim 9 wherein two to four guide elements are disposed evenly about a circumference of the spline region of the first shaft part, wherein in each case at least one transmission element is disposed between two guide elements.

16. A steering shaft for a motor vehicle, the steering shaft comprising:
a first shaft; and
a second shaft part that telescopes within the first shaft part, wherein the first shaft part comprises a spline region with a plastic coating, the spline region including
a guide element that is formed in the plastic coating and is in form-fit engagement with the second shaft part for guiding the first shaft part relative to the second shaft part, wherein the guide element in a spline head region comprises a recess that extends towards a shaft axis of the first shaft part and forms resilient flanks of the guide element that engage with a complementary structure of the second shaft part, and
a transmission element that is in engagement with the second shaft part for transmitting a torque, wherein the engagement between the transmission element and the second shaft is more loosely form-fit than the form-fit engagement between the guide element and the second shaft part.

17. The steering shaft of claim 16 wherein the plastic coating is disposed about a circumference of the first shaft part.

18. The steering shaft of claim 16 wherein the plastic coating is thicker in a region of the guide element than in a region of the transmission element.

19. The steering shaft of claim 16 wherein at least two, three, or four guide elements are disposed evenly about a circumference of the spline region.

20. The steering shaft of claim 16 wherein the spline region comprises a uniform spline system with splines of a same geometry and a spline for forming the guide element with the overmolding.

\* \* \* \* \*